(12) United States Patent
Horiuchi et al.

(10) Patent No.: US 12,394,212 B2
(45) Date of Patent: Aug. 19, 2025

(54) WARNING CONTROL APPARATUS, MOVING OBJECT, WARNING CONTROL METHOD, AND COMPUTER-READABLE STORAGE MEDIUM

(71) Applicant: HONDA MOTOR CO., LTD., Tokyo (JP)

(72) Inventors: Moriya Horiuchi, Saitama (JP); Shigeru Inoue, Saitama (JP); Takahiro Kurehashi, Saitama (JP); Yuta Sakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 465 days.

(21) Appl. No.: 17/834,888

(22) Filed: Jun. 7, 2022

(65) Prior Publication Data
US 2022/0406076 A1    Dec. 22, 2022

(30) Foreign Application Priority Data

Jun. 18, 2021 (JP) .................................. 2021-101644

(51) Int. Cl.
*G06V 20/58*    (2022.01)
*G06T 7/20*    (2017.01)
(Continued)

(52) U.S. Cl.
CPC ............. *G06V 20/58* (2022.01); *G06T 7/20* (2013.01); *G06T 7/70* (2017.01); *G06V 10/764* (2022.01);
(Continued)

(58) Field of Classification Search
CPC ...... G06V 20/58; G06V 10/764; G06V 40/10; G06T 7/20; G06T 7/70;
(Continued)

(56) References Cited

U.S. PATENT DOCUMENTS

| | | |
|---|---|---|
| 6,337,637 B1 | 1/2002 | Kubota |
| 2015/0035685 A1 | 2/2015 | Strickland |
| (Continued) | | |

FOREIGN PATENT DOCUMENTS

| | | |
|---|---|---|
| CN | 108172025 A | 6/2018 |
| JP | 2001126193 A | 5/2001 |
| (Continued) | | |

OTHER PUBLICATIONS

Office Action issued for counterpart Japanese Application No. 2021-101644, issued by the Japanese Patent Office on Dec. 6, 2022 (drafted on Nov. 29, 2022).

(Continued)

*Primary Examiner* — Akwasi M Sarpong
*Assistant Examiner* — Michael L Burleson (57) ABSTRACT

Provided is a warning control apparatus comprising: an obtainment unit configured to obtain recognition information including position information and a moving direction of each of a plurality of targets present outside a moving object; a classification unit configured to classify the plurality of targets into one or more groups based on the position information and the moving direction of each of the plurality of targets; a risk level determination unit configured to determine, based on position information and a moving direction of the group, a risk level at which each of the one or more groups approaches a moving object; a selection unit configured to select, based on the determined risk level, a plurality of groups to be warned; and a transmission control unit configured to control transmission of warning information including position information of the selected one or more groups.

14 Claims, 7 Drawing Sheets

(51) Int. Cl.
    *G06T 7/70*           (2017.01)
    *G06V 10/764*       (2022.01)
    *G06V 40/10*         (2022.01)
    *G08G 1/005*         (2006.01)

(52) U.S. Cl.
    CPC ............ *G06V 40/10* (2022.01); *G08G 1/005* (2013.01); *G06T 2207/30196* (2013.01); *G06T 2207/30252* (2013.01)

(58) Field of Classification Search
    CPC .......... G06T 2207/30196; G06T 2207/30252; G08G 1/005; G08G 1/162; G08G 1/166; H04W 4/40
    See application file for complete search history.

(56) References Cited

U.S. PATENT DOCUMENTS

| | | | | |
|---|---|---|---|---|
| 2018/0260635 | A1* | 9/2018 | Al-Dahle | ........... G08G 1/09626 |
| 2018/0302752 | A1* | 10/2018 | Ueno | ...................... H04W 4/80 |
| 2019/0236958 | A1 | 8/2019 | Fang | |
| 2019/0283802 | A1 | 9/2019 | Matsunaga | |
| 2020/0105132 | A1 | 4/2020 | Choi | |
| 2020/0152051 | A1 | 5/2020 | Morimura | |

FOREIGN PATENT DOCUMENTS

| | | |
|---|---|---|
| JP | 2004078320 A | 3/2004 |
| JP | 2008071062 A | 3/2008 |
| JP | 2008310376 A | 12/2008 |
| JP | 2017059095 A | 3/2017 |
| JP | 2017107463 A | 6/2017 |
| JP | 2017111741 A | 6/2017 |
| JP | 2018195194 A | 12/2018 |
| JP | 2019156222 A | 9/2019 |
| JP | 2020052722 A | 4/2020 |
| JP | 2020080114 A | 5/2020 |
| WO | 2018002985 A1 | 1/2018 |

OTHER PUBLICATIONS

Office Action issued for counterpart Chinese Application 202210473467.2, issued by The State Intellectual Property Office of People's Republic of China on May 25, 2023.

* cited by examiner

WARNING CONTROL APPARATUS, MOVING OBJECT, WARNING CONTROL METHOD, AND COMPUTER-READABLE STORAGE MEDIUM

The contents of the following Japanese patent application(s) are incorporated herein by reference:
NO. 2021-101644 filed on Jun. 18, 2021.

BACKGROUND

1. Technical Field

The present invention relates to a warning control apparatus, a moving object, a warning control method, and a computer-readable storage medium.

2. Related Art

Patent Document 1 describes that pedestrians on a pedestrian crossing are grouped in accordance with a travelling direction of each pedestrian to predict times required only for a first pedestrian and a last pedestrian in the group to reach a lane side. Patent Document 2 describes, regarding a pedestrian terminal apparatus, that it is determined whether a pedestrian carrying the pedestrian terminal apparatus is located within a pedestrian group based on position information of the pedestrian terminal apparatus and position information of another pedestrian terminal apparatus included in notice information and that pedestrian-to-vehicle communication is stopped if the pedestrian is located within the pedestrian group.

PRIOR ART DOCUMENT

Patent Document 1: Japanese Patent Application Publication No. 2001-126193
Patent Document 2: Japanese Patent Application Publication No. 2017-111741

DESCRIPTION OF EXEMPLARY EMBODIMENTS

Hereinafter, the present invention will be described through embodiments of the invention, but the following embodiments do not limit the claimed invention. Moreover, not all combinations of features described in the embodiments are necessary to solutions of the invention.

Figure 1:
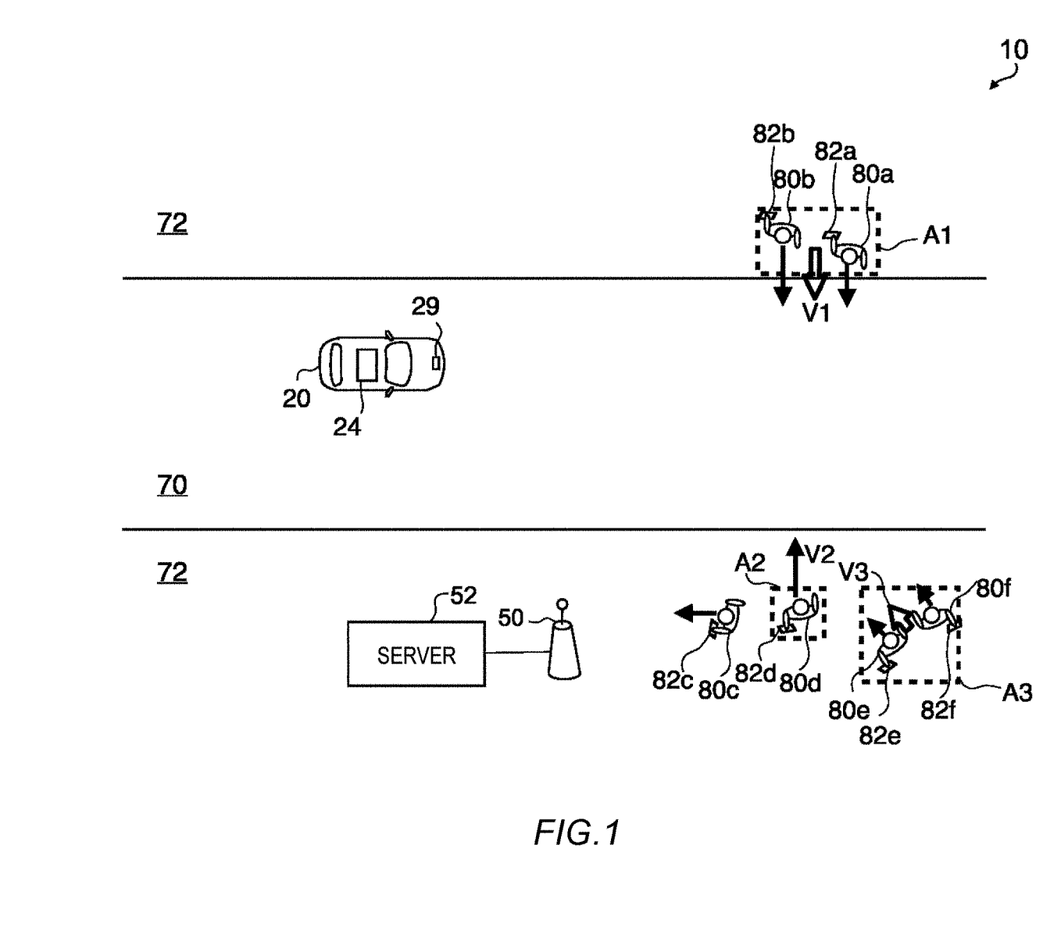
FIG. 1 schematically shows a usage scene of a warning system 10.

FIG. 1 schematically shows a usage scene of a warning system 10. The warning system 10 includes a vehicle 20, a base station 50 and a server 52, as well as a terminal 82a, a terminal 82b, a terminal 82c, a terminal 82d, a terminal 82e, and a terminal 82f.

The terminal 82a is carried by a pedestrian 80a. The terminal 82b is carried by a pedestrian 80b. The terminal 82c is carried by a pedestrian 80c. The terminal 82d is carried by a pedestrian 80d. The terminal 82e is carried by a pedestrian 80e. The terminal 82f is carried by a pedestrian 80f The terminal 82 performs mobile communications through the base station 50. The terminal 82a, the terminal 82b, the terminal 82c, the terminal 82d, the terminal 82e, and the terminal 82f receive a variety of services through the server 52 connected to the base station 50. The server 52 may include, for example, an edge computing server such as a MEC server. It should be noted that the terminal 82a, the terminal 82b, the terminal 82c, the terminal 82d, the terminal 82e, and the terminal 82f may be referred to collectively as "terminals 82". The pedestrian 80a, the pedestrian 80b, the pedestrian 80c, the pedestrian 80d, the pedestrian 80e, and the pedestrian 80f may be referred to collectively as "pedestrian(s) 80". The vehicle 20 is one example of a "moving object".

In the warning system 10, the vehicle 20 transmits warning information for causing the terminal 82 to output warning information when there is a pedestrian 80 at risk of approaching the vehicle 20. When receiving the warning information, the terminal 82 gives warning to the pedestrian 80 with warning display, sound, vibration, or the like. This gives notice to the pedestrian 80 that the vehicle 20 is approaching.

The terminal 82 may be a mobile terminal such as a mobile phone or a smartphone. The terminal 82 includes a positioning function. For example, the terminal 82 receives a radio wave transmitted from a Global Navigation Satellite System (GNSS) satellite, and determines a current position of the terminal 82 based on the radio wave transmitted from the GNSS satellite. The terminal 82 periodically updates the current position of the terminal 82 by periodically performing positioning.

In this embodiment, a case will be mainly described where a target at risk of approaching the vehicle 20 is a "pedestrian". However, the target at risk of approaching the vehicle 20 may be another moving object or vehicle. In this case, a "terminal" may be a communication apparatus such as a Telematics Control Unit (TCU) included in another vehicle.

The vehicle 20 includes a sensor 29 and a warning control apparatus 24. The sensor 29 includes a camera and a radar. The sensor 29 obtains information on a front area of the vehicle 20. For example, the sensor 29 obtains an image of and ranging information on the front area of the vehicle 20. The warning control apparatus 24 recognizes the image obtained by a camera included in the sensor 29, to detect the pedestrian 80. Moreover, the warning control apparatus 24 detects a current position of the pedestrian 80 based on the ranging information obtained by the radar and a current position of the vehicle 20. The warning control apparatus 24 identifies a moving direction of the pedestrian 80 or the like based on an orientation of the pedestrian 80 or the like. The warning control apparatus 24 identifies, based on the current position and the moving direction of the pedestrian 80, the pedestrian 80 at risk of approaching the vehicle 20, in particular, the pedestrian 80 who may move onto a scheduled driving route of the vehicle 20.

For example, in a situation shown in FIG. 1, the vehicle 20 is driving in a roadway 70. The roadway 70 is provided with walkways 72 on its both sides. The warning control apparatus 24 recognizes, from information detected by the sensor 29, a position of the pedestrian 80 walking in the walkway 72. The warning control apparatus 24 may identify a moving speed of the pedestrian 80 based on a temporal change in the position of the pedestrian 80, a temporal change in a distance from the vehicle 20 to the pedestrian 80, and a body orientation of the pedestrian 80, or the like. It should be noted that an arrow correlated with the pedestrian 80 in FIG. 1 roughly indicates the moving speed of the pedestrian 80.

The warning control apparatus 24 groups the pedestrians 80 based on the recognized positions and moving speeds of the pedestrians 80. For example, the warning control apparatus 24 classifies, into a same group, the pedestrians 80 located closer to one another and having a higher coincidence level of moving speed. Specifically, the warning control apparatus 24 determines that the pedestrian 80a and the pedestrian 80b are located close to each other and have a high coincidence level of moving speed, to classify the pedestrian 80a and the pedestrian 80b into one group. The warning control apparatus 24 determines that the pedestrian 80e and the pedestrian 80f are located close to each other and have a high coincidence level of moving speed in a direction towards the roadway 70, to classify the pedestrian 80e and the pedestrian 80f into one group. The warning control apparatus 24 determines that the pedestrian 80c and the pedestrian 80d have a low coincidence level of moving speed although being located close to each other, to classify the pedestrian 80c and the pedestrian 80d into separate groups.

Based on the positions and the moving directions of the pedestrians 80 classified into the same group, the warning control apparatus 24 determines a risk level of approaching the vehicle 20 for each group. For example, the warning control apparatus 24 sets an average position of the positions of the pedestrian 80a and the pedestrian 80b as a position of the group, while setting an average speed of the moving speeds of the pedestrian 80a and the pedestrian 80b as a moving speed V1 of the group. From the moving speed of the group including the pedestrian 80a and the pedestrian 80b, the warning control apparatus 24 determines, when the group is moving in the direction towards the roadway 70 and keeps moving in the same direction, that the group may enter the roadway 70 before the vehicle 20 passes by. Therefore, the warning control apparatus 24 determines that the group including the pedestrian 80a and the pedestrian 80b has a high risk level of approaching the vehicle 20 (the risk level is "high").

For the group including the pedestrian 80e and the pedestrian 80f, the warning control apparatus 24 sets an average position of the positions of the pedestrian 80e and the pedestrian 80f as a position of the group, while setting an average speed of the moving speeds of the pedestrian 80e and the pedestrian 80f as a moving speed V3 of the group. The warning control apparatus 24 determines, from the moving speed of the group including the pedestrian 80e and the pedestrian 80f, that the vehicle 20 is likely to pass by before the group enters the roadway 70 although the group is moving in the direction towards the roadway 70. Therefore, the warning control apparatus 24 determines that the group including the pedestrian 80e and the pedestrian 80f has a moderate risk level of approaching the vehicle 20 (the risk level is "moderate").

For the group of the pedestrian 80c, the warning control apparatus 24 sets the position of the pedestrian 80c as a position of the group, while setting the moving speed of the pedestrian 80c as a moving speed of the group. The warning control apparatus 24 determines that the group of the pedestrian 80c is moving in the walkway 72 in parallel with the roadway 70, and determines that the group of the pedestrian 80c has a low risk level of approaching the vehicle 20 (the risk level is "low"). For the group of the pedestrian 80d, the warning control apparatus 24 sets the position of the pedestrian 80d as a position of the group, while setting the moving speed of the pedestrian 80d as a moving speed of the group. The warning control apparatus 24 determines, when the group of the pedestrian 80d is moving in the direction towards the roadway 70 and keeps moving in the same direction, that the group may enter the roadway 70 before the vehicle 20 passes by. Therefore, the warning control apparatus 24 determines that the group of the pedestrian 80d has a high risk level of approaching the vehicle 20 (the risk level is "high").

The warning control apparatus 24 selects, as a target to be transmitted the warning information, a group determined to have a risk level of "high" or "moderate". The warning control apparatus 24 generates the warning information including a position of each of the three groups selected as the target to be transmitted the warning information. For example, the warning control apparatus 24 sets an area A1 including the positions of the pedestrian 80a and the pedestrian 80b, an area A2 including the position of the pedestrian 80d, and an area A3 including the positions of the pedestrian 80e and the pedestrian 80f. The warning control apparatus 24 generates first warning information including latitude/longitude information indicating a position of the area A1, second warning information including latitude/longitude information indicating a position of the area A2, and third warning information including latitude/longitude information indicating a position of the area A3. The warning control apparatus 24 transmits the first warning information, the second warning information, and the third warning information. For example, the warning control apparatus 24 transmits the first warning information, the second warning information, and the third warning information by broadcasting.

The terminal 82a identifies the area A1 from the latitude/longitude information included in the received first warning information, and determines that a current position of the terminal 82a is included in the area A1. Accordingly, the terminal 82a outputs an alarm with an HMI function of the terminal 82a. Similarly, the terminal 82b determines that a current position of the terminal 82b is included in the area A1 identified from the received first warning information, and outputs an alarm with an HMI function of the terminal 82b. Moreover, the terminal 82d determines that a current position of the terminal 82d is included in the area A2 identified from the received second warning information, and outputs an alarm with an HMI function of the terminal 82d. Moreover, the terminal 82e and the terminal 82f respectively determine that current positions of the terminals 82e and 82f are included in the area A3 identified from the received third warning information, and output alarms with HMI functions of the terminals 82e and 82f.

On the other hand, the terminal 82c determines that a position of the terminal 82c is not included in any of the area A1, the area A2, and the area A3 indicated by the received first warning information, second warning information, and third warning information. As a result, the terminal 82c determines that there is no need to output an alarm to the pedestrian 80c. Therefore, the terminal 82b discards the warning information without outputting an alarm.

Thus, in the warning system 10, the warning control apparatus 24 can classify the pedestrian 80a, the pedestrian 80b, the pedestrian 80d, the pedestrian 80e, and the pedestrian 80f into the three groups to transmit the warning information to the three groups, instead of transmitting the warning information to each of the pedestrian 80a, the pedestrian 80b, the pedestrian 80d, the pedestrian 80e, and the pedestrian 80f. Therefore, it is possible to reduce a communication resource used for transmission of the warning information. This can reduce a possibility that the warning information can be no longer transmitted, even in a situation where there are many pedestrians 80 to be transmitted the warning information.

Figure 2:
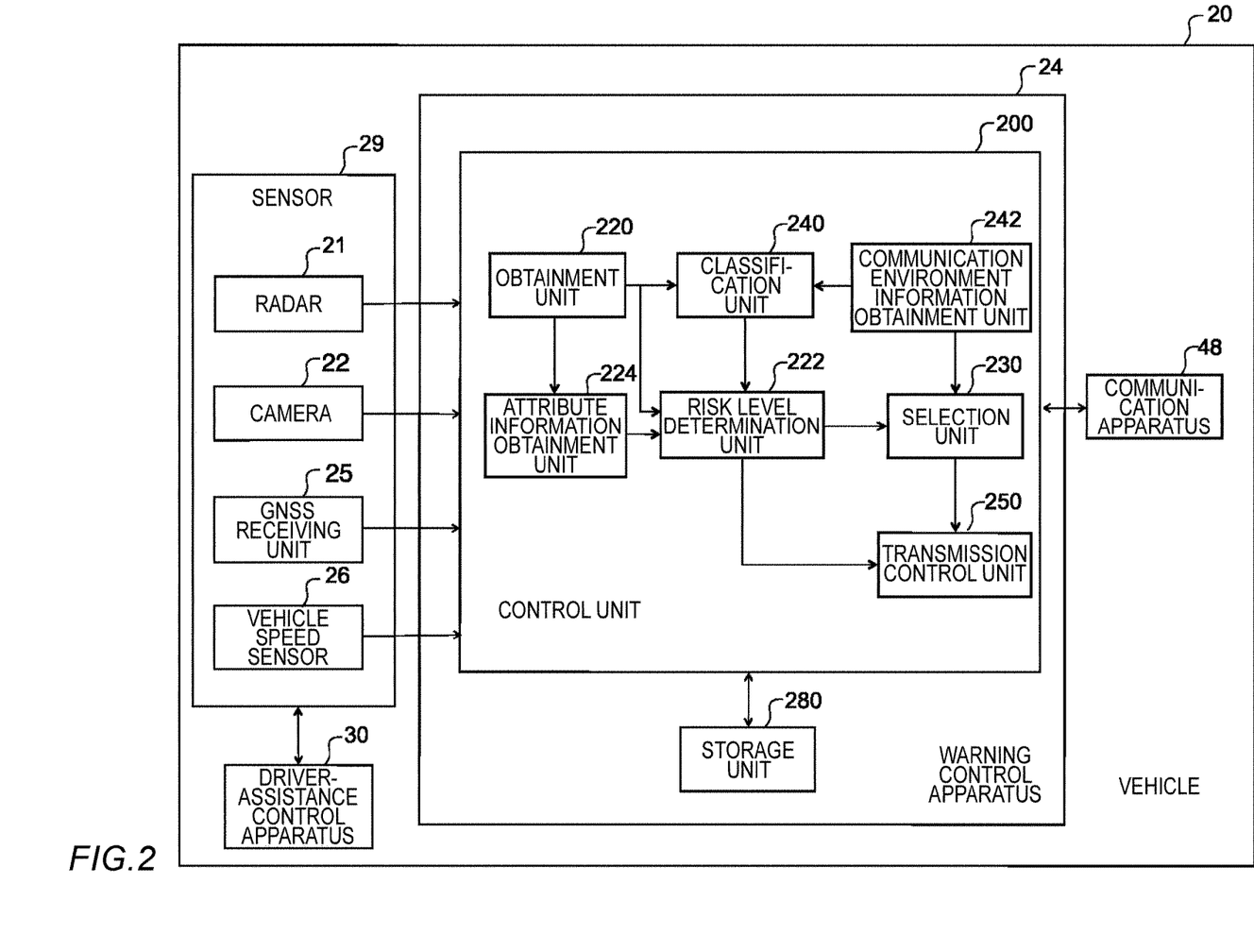
FIG. 2 shows a system configuration of a vehicle 20.

FIG. 2 shows a system configuration of the vehicle 20. The vehicle 20 includes a sensor 29, a warning control apparatus 24, and a driver-assistance control apparatus 30.

The sensor 29 includes a radar 21, a camera 22, a GNSS receiving unit 25, and a vehicle speed sensor 26. The radar 21 may be a LiDAR, a millimeter-wave radar, or the like. The GNSS receiving unit 25 receives a radio wave transmitted from a Global Navigation Satellite System (GNSS) satellite. The GNSS receiving unit 25 generates information indicating the current position of the vehicle 20 based on a signal received from the GNSS satellite. The camera 22 captures an image of a surrounding area of the vehicle 20 to generate image information. For example, the camera 22 captures an image in a travelling direction of the vehicle 20 to generate the image information. The camera 22 is one example of an image capturing unit mounted on the vehicle 20. The vehicle speed sensor 26 detects a vehicle speed of the vehicle 20. It should be noted that sensor 29 may include a position sensor such as an odometer, or an Inertial Measurement Unit (IMU) such as an acceleration sensor or an attitude sensor.

The driver-assistance control apparatus 30 uses the information detected by the sensor 29, to perform driver-assistance of the vehicle 20. The driver-assistance control apparatus 30 may be realized by an Electronic Control Unit (ECU) having a function of an Advanced Driver-Assistance Systems (ADAS).

The warning control apparatus 24 includes a control unit 200, a storage unit 280, and a communication apparatus 48. The control unit 200 is realized by, for example, an arithmetic processing unit including a processor. The storage unit 280 is realized including a non-volatile storage medium. The control unit 200 uses the information stored in the storage unit 280 to perform processing. The communication apparatus 48 is responsible for direct communication with the terminal 82. The control unit 200 may be realized by the ECU including a microcomputer provided with a CPU, a ROM, a RAM, an I/O, a bus, and the like.

The control unit 200 includes an obtainment unit 220, a risk level determination unit 222, a selection unit 230, a classification unit 240, an attribute information obtainment unit 224, a communication environment information obtainment unit 242, and a transmission control unit 250. It should be noted that a configuration may be adopted in which the control unit 200 does not have some functions in functional blocks shown in FIG. 2. For example, a configuration may be adopted in which only some functions are implemented in the control unit 200 while the other functions are implemented as functions of the sensor 29 or another circuit.

The obtainment unit 220 obtains recognition information including position information and a moving direction of each of a plurality of targets present outside the vehicle 20. For example, the obtainment unit 220 obtains the recognition information by performing image recognition of an image captured by the camera 22. Specifically, the obtainment unit 220 obtains the recognition information including the position information and the moving direction by recognizing the position information and the moving direction through the image recognition of the image captured by the camera 22 mounted on the vehicle 20. Specifically, the obtainment unit 220 extracts, by performing the image recognition of the image captured by the camera 22, the pedestrian 80 at risk of approaching the vehicle 20. Moreover, the obtainment unit 220 may obtain distance information to the pedestrian 80 with the radar 21. The obtainment unit 220 may obtain the distance information to the pedestrian 80 based on the image captured by the camera 22. The obtainment unit 220 calculates, based on the position information of the vehicle 20 and the distance information to the pedestrian 80, a position of a target at risk of approaching the vehicle 20. The obtainment unit 220 may recognize the moving direction of the pedestrian 80 based on the body orientation of the pedestrian 80.

The classification unit 240 classifies the plurality of targets into one or more groups based on position information and a moving direction of each of the plurality of targets. For example, the classification unit 240 may classify the targets having higher coincidence levels of position and moving direction than predetermined values into the same group, while classifying the targets having lower coincidence levels of position and moving direction than the predetermined values into different groups. The risk level determination unit 222 determines, based on position information and moving directions of the groups, a risk level at which each of the one or more groups approaches the vehicle 20. The selection unit 230 selects, based on the risk level determined by the risk level determination unit 222, a plurality of groups to be warned. The transmission control unit 250 controls transmission of warning information including position information of the one or more groups selected by the selection unit 230.

The recognition information may include the position information, the moving direction, and a moving speed of each of the plurality of targets present outside the vehicle 20. The classification unit 240 may classify the plurality of targets into one or more groups based on the position information, the moving direction, and the moving speed of each of the plurality of targets. For example, the obtainment unit 220 may recognize the moving speed of the target based on a temporal change in a position of the target. The obtainment unit 220 may recognize the moving speed of the target by obtaining a relative speed between the recognized moving speed of the target and the moving speed of the vehicle 20 detected by the vehicle speed sensor 26. The obtainment unit 220 may recognize, based on a temporal change in a distance to a recognized target, the moving speed of the target by obtaining the relative speed between the recognized target and the vehicle 20.

The transmission control unit 250 may control the transmission of the warning information including central coordinates of the position information of the plurality of targets classified into each group. The transmission control unit 250 may control the transmission of the warning information including a plurality of pieces of coordinate information indicating an area including the position information of the plurality of targets classified into each group.

It should be noted that the transmission control unit 250 controls the transmission of the warning information performed without specifying a destination. For example, the transmission control unit 250 may cause the communication apparatus 48 to transmit the warning information by broadcasting via direct communication. It should be noted that the transmission control unit 250 may transmit the warning information to the server 52 that manages position information of a plurality of terminals 82, and control the transmission of the warning information to the terminal 82 through the server 52. It should be noted that the transmission control unit 250 may cause the communication apparatus 48 to transmit the warning information via directional communication. For example, the communication apparatus 48 has a directional antenna, and the transmission control unit 250 may cause the communication apparatus 48 to transmit the warning information towards a position of the recognized target.

The communication environment information obtainment unit 220 obtains information indicating a communication environment. The classification unit 240 determines, based on the communication environment obtained by the communication environment information obtainment unit 220, a number of at least one group into which the plurality of targets are classified. For example, the communication environment information obtainment unit 220 may obtain information indicating a congestion level of communication environment. The classification unit 240 may reduce the number of groups into which the plurality of targets are classified as the congestion level obtained by the communication environment information obtainment unit 220 is higher. The information indicating the congestion level of communication environment may be delay time information of communication, communication speed information, packet loss rate, or the like.

When the targets are persons, the attribute information obtainment unit 224 obtains information indicating an age of each of the plurality of targets. When at least one of targets classified into each group has an age included in a predetermined age group, the risk level determination unit 222 determines the risk level to be higher than when none of targets classified into each group has an age included in the predetermined age group. For example, the obtainment unit 220 recognizes whether the pedestrian 80 is a child by performing image recognition of the image captured by the camera 22. The attribute information obtainment unit 224 obtains from the obtainment unit 220 a recognition result indicating whether the pedestrian is a child, and when the attribute information obtainment unit 224 obtains the recognition result indicating that the pedestrian is a child, the risk level determination unit 222 determines the risk level to be high.

Figure 3:
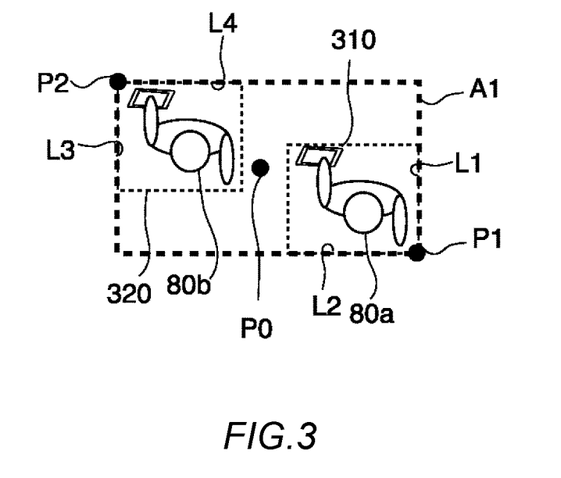
FIG. 3 illustrates one example of position information of a group included in warning information transmitted by a transmission control unit 250.

FIG. 3 illustrates one example of position information of a group included in warning information transmitted by the transmission control unit 250. With reference to FIG. 3, described will be position information of the area A1 of the group including the pedestrian 80a and the pedestrian 80b.

The area 310 is a rectangular area where the recognized pedestrian 80a may be present. The area 320 is a rectangular area where the recognized pedestrian 80b may be present. The area 310 and the area 320 may each have a predetermined size occupied by a person. Orientations of the area 310 and the area 310 may each be set according to an orientation of the person. The area A1 is surrounded by two sides with portions corresponding to two sides L1 and L2 that show an outline of the area 310 and two sides with portions corresponding to two sides L3 and L4 that show an outline of the area 320.

The position information of the group included in the warning information may include information indicating coordinates of a central point P0 of the area A1. The position information of the group included in the warning information may include information indicating latitude/longitude coordinates of the central point P0 of the area A1 and a size of the area A1. The position information of the group included in the warning information may include information indicating the latitude/longitude coordinates of the central point P0 of the area A1 and lengths of two sides of an outline of the area A1. The position information of the group included in the warning information may include information indicating latitude/longitude coordinates of two diagonal vertices P1 and P2 of the area A1.

Figure 4:
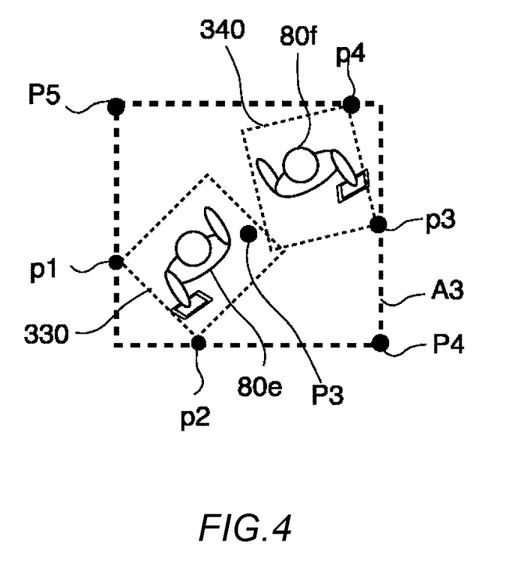
FIG. 4 illustrates another example of the position information of the group included in the warning information transmitted by the transmission control unit 250.

FIG. 4 illustrates another example of the position information of the group included in the warning information transmitted by the transmission control unit 250. With reference to FIG. 4, described will be position information of the area A3 of the group including the pedestrian 80e and the pedestrian 80f.

The area 330 is a rectangular area where the recognized pedestrian 80e may be present. The area 340 is a rectangular area where the recognized pedestrian 80f may be present. The area 330 and the area 340 may each have a predetermined size occupied by a person. Orientations of the area 330 and the area 340 may each be set according to an orientation of the person. The area A3 is surrounded by two sides respectively including two vertices p1 and p2 of an outline of the area 330 and two sides respectively including two vertices p3 and p4 of an outline of the area 340.

The position information of the group included in the warning information may include information indicating latitude/longitude coordinates of a central point P3 of the area A3. The position information of the group included in the warning information may include information indicating latitude/longitude coordinates of the central point P3 of the area A3 and a size of the area A3. The position information of the group included in the warning information may include information indicating the latitude/longitude coordinates of the central point P3 of the area A3 and lengths of two sides of an outline of the area A3. The position information of the group included in the warning information may include information indicating latitude/longitude coordinates of two diagonal vertices P4 and P5 of the area A3.

It should be noted that the position information of the group included in the warning information may indicate an area having any shape other than a rectangular shape. The position information of the group included in the warning information may indicate a circular, an elliptic, or any polygonal area. Moreover, the position information of the group included in the warning information may include average coordinates of latitude/longitude coordinates of a plurality of pedestrians 80.

Figure 5:
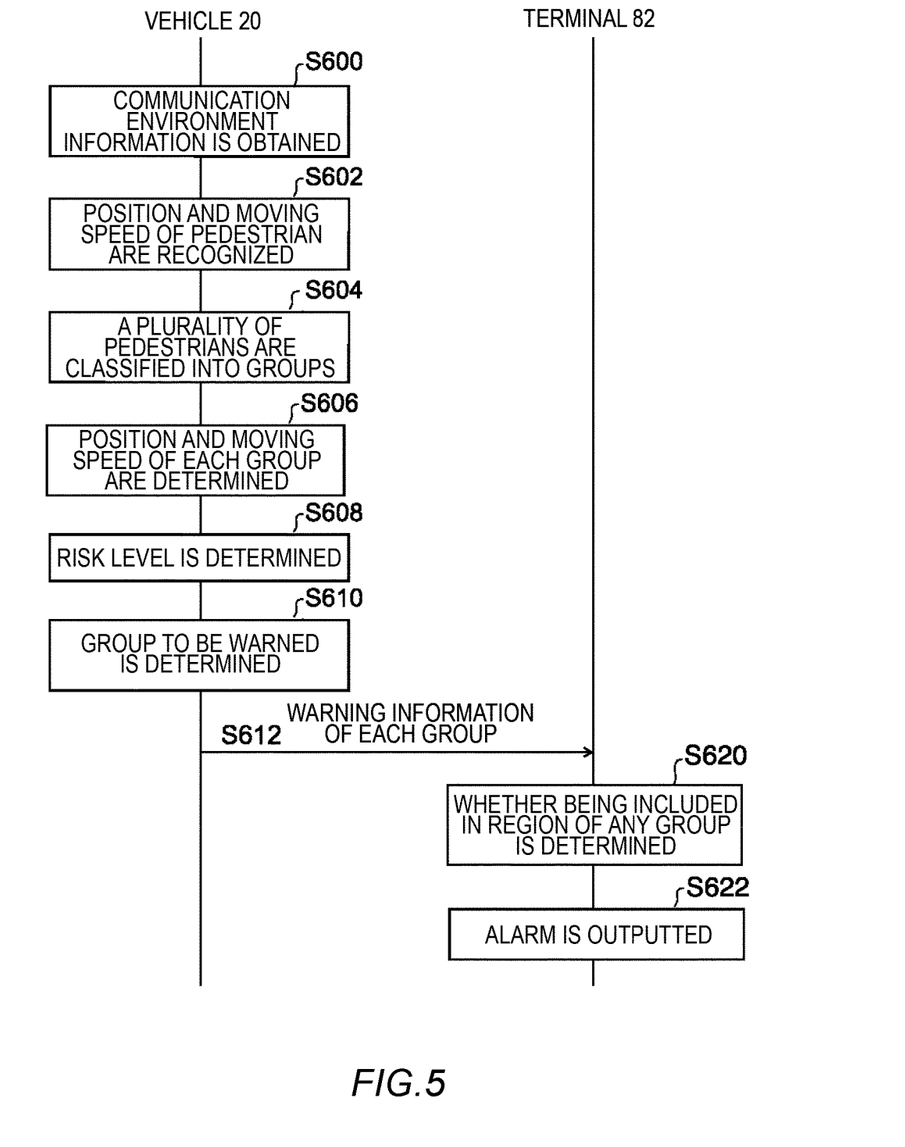
FIG. 5 roughly shows a processing flow related to a warning control method executed by a vehicle 20 and a terminal 82.

FIG. 5 roughly shows a processing flow related to a warning control method executed by a vehicle 20 and a terminal 82. FIG. 5 shows a processing flow for a case where a warning control apparatus 24 transmits warning information to the terminal 82 via direct communication.

In S600, a communication environment information obtainment unit 242 obtains communication environment information. For example, the communication environment information obtainment unit 242 obtains information indicating a congestion level of communication. In S602, an obtainment unit 220 recognizes a position and a moving speed of each of a plurality of pedestrians 80 based on an image captured by a camera 22 and ranging information from a radar 21.

In S604, a classification unit 240 classifies the pedestrians 80 recognized in S602 into one or more groups. For example, the classification unit 240 classifies the pedestrians 80 into the one or more groups at least based on positions and moving directions of the pedestrians 80. For example, the classification unit 240 classifies a plurality of pedestrians 80 having higher coincidence levels of position and moving speed of the pedestrians 80 than predetermined values, into one group.

In S606, a risk level determination unit 222 determines, for each of the groups obtained through the classification in S604, a position and a moving speed of the group. For example, the risk level determination unit 222 determines, as the position of the group, average coordinates of latitude/longitude coordinates of the positions of the pedestrians 80 classified into a same group. Moreover, as described in association with FIG. 3 and FIG. 4, the risk level determination unit 222 may determine, as the position of the group, latitude/longitude coordinates indicating an area including ranges occupied by the pedestrians 80 classified into each group. Moreover, the risk level determination unit 222 determines, as the moving speed of the group, an average speed of moving speeds at the positions of the pedestrians 80 classified into the same group.

In S608, the risk level determination unit 222 determines a risk level against the vehicle 20 for each of the groups. The risk level determination unit 222 sets the risk level of the group high when a moving direction of the group is towards a roadway 70. The risk level determination unit 222 sets the risk level of the group higher as the moving speed of the group in the direction towards the roadway 70 is higher. The risk level determination unit 222 sets the risk level of the group higher as the position of the group is closer to the roadway 70. The risk level determination unit 222 sets the risk level high when a distance that the group can move within a time required for the vehicle 20 to reach the position of the group in its driving direction is longer than a distance from the position of the group to the roadway 70. The risk level determination unit 222 sets the risk level of the group including the pedestrian 80 recognized as a child high.

In S610, a selection unit 230 selects, based on the risk level determined in S608, a group to be transmitted the warning information among the groups obtained through the classification in S604. The selection unit 230 selects, as a group to be warned, a group determined to have a higher risk level than a predetermined risk level in S606. For example, the selection unit 230 selects, as the group to be transmitted the warning information, a group determined to have a risk level of "high" or "moderate".

It should be noted that the selection unit 230 may determine an upper limit of a number of at least one time that the warning information is transmitted, based on the congestion level of communication obtained by the communication environment information obtainment unit 242 in S600. For example, the selection unit 230 reduces the number of times that the warning information is transmitted, as the congestion level of communication is higher. The selection unit 230 may preferentially select a group having a higher risk level as the group to be transmitted the warning information, such that a number of at least one group to be transmitted the warning information is equal to or smaller than the upper limit.

In S612, a transmission control unit 250 causes warning information including the position information of each group determined in S606 and the risk level of each group determined in S608 to be transmitted by broadcasting. It should be noted that, when a plurality of pieces of warning information is transmitted, the transmission control unit 250 may cause the plurality of pieces of warning information to be transmitted in one transmission data. When a plurality of pieces of warning information is transmitted, the transmission control unit 250 may cause the plurality of pieces of warning information to be transmitted as separate transmission data.

When receiving the warning information, in S620, the terminal 82 identifies, based on the position information of the group included in the warning information, an area occupied by the pedestrians classified into each group, and determines whether a current position of the terminal 82 itself is included in the identified area. In S622, when the current position of the terminal 82 itself is included in the area identified based on the position information of the group included in the warning information, the terminal 82 outputs an alarm through an HMI function of the terminal 82 itself depending on the risk level included in the warning information. Terminal 82 may output alarm information having a higher alarm level as the risk level included in the warning information is higher. For example, the terminal 82 may give an alarm with vibration when the risk level included in the warning information is "moderate", while giving an alarm with voice and vibration when the risk level included in the warning information is "high".

It should be noted that, when outputting an alarm, the terminal 82 may instruct another terminal 82 located nearby to output an alarm. For example, the terminal 82 may instruct another terminal 82 correlated in advance to output an alarm. Specifically, the terminal 82 outputting an alarm may instruct another terminal 82 carried by its contractor's family member to output an alarm. The terminal 82 outputting an alarm may instruct another predetermined terminal 82 paired via Bluetooth (registered trademark) or the like to output an alarm. The terminal 82 outputting an alarm may instruct, via Near Field Communication, another terminal 82 located in a vicinity to output an alarm.

It should be noted that, as described in S610, the selection unit 230 may select the group to be transmitted the warning information, such that the number of groups to be transmitted the warning information is equal to or smaller than the upper limit determined by the congestion level of communication. However, for example, when the classification classifies the pedestrians into many groups, the group determined to have a high risk level may not be selected as the target to be transmitted the warning information. In this case, selecting parameters used for the classification in S604 may set the number of groups to be transmitted the warning information in S610 to be equal to or smaller than the upper limit determined by the congestion level of communication. For example, repeating the processing from S604 to S610 multiple times by changing the parameters used for the classification in S604 may set the number of groups to be transmitted the warning information to be equal to or smaller than the upper limit determined by the congestion level of communication. For example, if the classification is made in S604 by using the position and the moving speed of the group as the parameters, when the number of groups to be transmitted the warning information in S610 cannot be set to be equal to or smaller than the upper limit determined by the congestion level of communication, executing the processing from S604 again and making the classification in S604 by using the position and the moving direction of the group as the parameters may set the number of groups to be transmitted the warning information to be equal to or smaller than the upper limit determined by the congestion level of communication.

Figure 6:
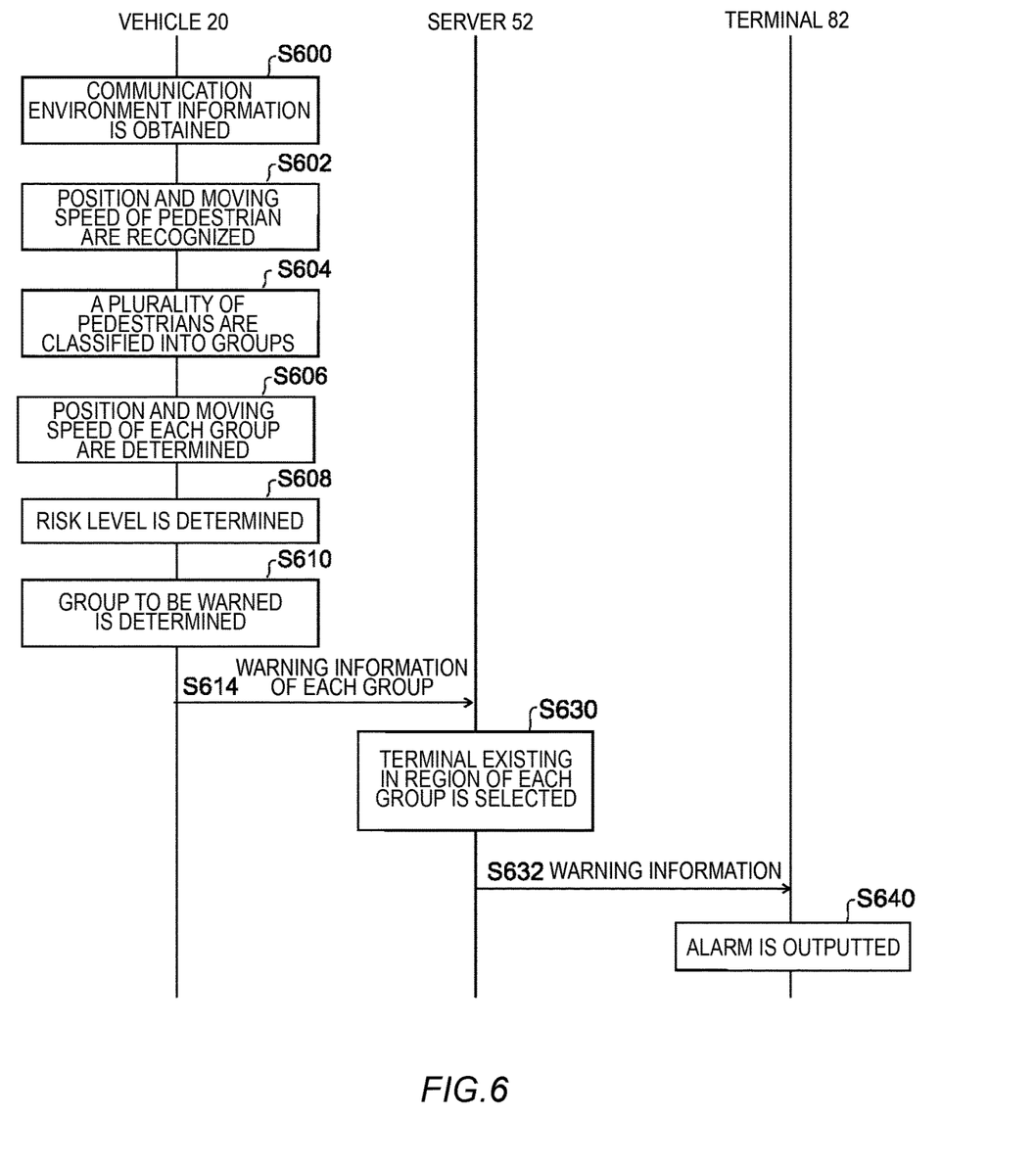
FIG. 6 roughly shows another processing flow related to the warning control method executed by the vehicle 20, a server 52, and the terminal 82.

FIG. 6 roughly shows another processing flow related to the warning control method executed by the vehicle 20, a server 52 and the terminal 82. FIG. 6 shows a processing flow for a case where the warning control apparatus 24 transmits the warning information to the terminal 82 via the server 52. The server 52 collects and stores current position information of the terminal 82. Since the processing from S600 to S610 in FIG. 6 is the same as the processing from S600 to S610 described in association with FIG. 5, description of the former will be omitted.

In S614, the transmission control unit 250 causes the warning information including the position information of each group determined in S606 to be transmitted to the server 52. When receiving the warning information, the server 52 selects, based on the position information of each group included in the warning information, the terminal 82 present in the area occupied by the pedestrians classified into each group. For example, the server 52 selects, with reference to the current position information of the terminal 82 stored by the server 52, the terminal 82 whose current position is present in the area of each group identified from the position information of each group included in the warning information.

In S632, the server 52 transmits the warning information to the terminal 82 selected in S630. In S640, the terminal 82 having received the warning information transmitted from the server 52 outputs an alarm through the HMI function of the terminal 82.

It should be noted that a driver-assistance control apparatus 30 may provide driver-assistance along with the transmission of the warning information in S612 of FIG. 5 or S614 of FIG. 6. For example, when a positional relationship between the pedestrian 80 and the vehicle 20 satisfies a predetermined condition, the driver-assistance control apparatus 30 may give notice to the pedestrian 80 that the vehicle 20 is approaching, by decelerating the vehicle 20 or performing beam passing or horn announcement with an Advanced Emergency Braking System function.

As described above, in the warning system 10, the warning control apparatus 24 can classify the pedestrians 80 to be transmitted the warning information into the number of groups smaller than the number of pedestrians 80, to specify the position information of the group and transmit the warning information. Therefore, it is possible to reduce a communication resource used for the transmission of the warning information. This can reduce a possibility that the warning information can no longer be transmitted, even in a situation where there are many pedestrians 80 to be transmitted the warning information. Moreover, it is possible to reduce a possibility that the warning information is redundantly transmitted to the plurality of pedestrians 80 located close to one another, as compared with a case where the warning information including the position information of each of the pedestrians 80 is transmitted. Moreover, the warning control apparatus 24 determines the risk level by putting the pedestrians 80 together into a small number of groups, so that a calculating amount can be reduced as compared with a case where the risk level is determined for all of the pedestrians 80.

It should be noted that, in the above description, a configuration has been described in which the recognition information on the position of the pedestrian 80 is obtained by the vehicle 20 recognizing the position of the pedestrian 80. However, a configuration can be adopted in which the recognition information on the position of the pedestrian 80 recognized by the server 52 or another vehicle is obtained from the server 52 or the other vehicle.

It should be noted that communication between the warning control apparatus 24 and the terminal 82 may be performed via short-range direct communication in Cellular-V2X. The short-range direct communication in Cellular-V2X includes a communication system such as LTE-V2X PC5 or 5G-V2X PC5. A configuration may be adopted in which Wi-Fi (registered trademark) or Dedicated Short Range Communications (DSRC) is used as direct communication. The warning control apparatus 24 may communicate with the terminal 82 via a base station. Moreover, the communication between the warning control apparatus 24 and the terminal 82 may adopt any direct communication system such as Bluetooth (registered trademark) in addition to Cellular-V2X and DSRC (registered trademark). The warning control apparatus 24 may perform direct communication with the terminal 82 by using a communication infrastructure included in Intelligent Transport Systems (ITS).

It should be noted that the vehicle 20 is one example of transportation equipment. The transportation equipment includes, for example, an automobile such as a passenger vehicle or a bus, a saddle-ride type vehicle, and a bicycle. Moreover, the moving object includes not only a person but also transportation equipment, for example, an automobile such as a passenger vehicle or a bus, a saddle-ride type vehicle, and a bicycle.

Figure 7:
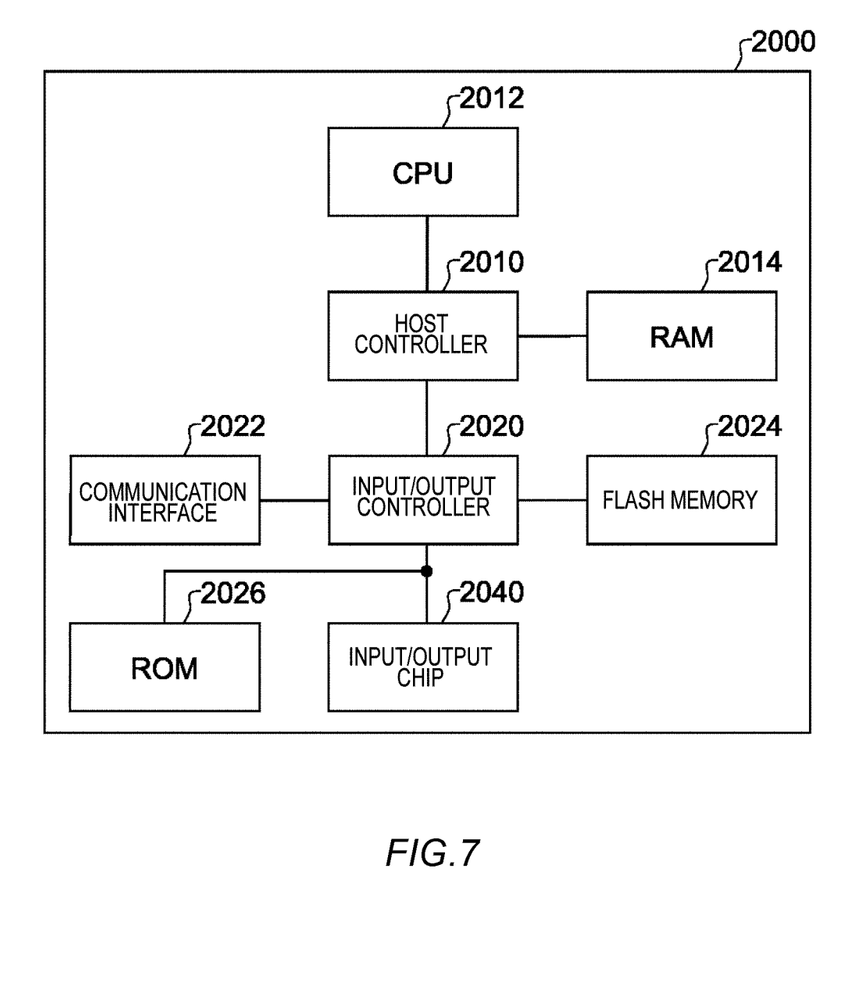
FIG. 7 shows an example of a computer 2000.

FIG. 7 shows an example of a computer 2000 where a plurality of embodiments of the present invention may be entirely or partially embodied. A program installed on the computer 2000 can cause the computer 2000 to function as an apparatus such as the warning control apparatus 24 according to the embodiments or each unit of that apparatus, to execute operations associated with that apparatus or each unit of that apparatus, and/or to execute a process according to the embodiments or steps of that process. Such a program may be executed by a CPU 2012 in order to cause the computer 2000 to execute a specific operation associated with some or all of the processing procedures and the blocks in the block diagrams described herein.

The computer 2000 according to this embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program or the like that is executed by the computer 2000 during activation, and/or a program that depends on hardware of the computer 2000. The input/output chip 2040 may also connect various input/output units such as a keyboard, a mouse, and a monitor to the input/output controller 2020 via an input/output port such as a serial port, a parallel port, a keyboard port, a mouse port, a monitor port, a USB port, an HDMI (registered trademark) port.

A program is provided via a computer-readable medium such as a CD-ROM, a DVD-ROM, or a memory card, or a network. The RAM 2014, the ROM 2026, or the flash memory 2024 is an example of the computer-readable medium. The program is installed in the flash memory 2024, the RAM 2014, or the ROM 2026, and is executed by the CPU 2012. Information processing written in these programs is read by the computer 2000, resulting in cooperation between a program and the above described various types of hardware resources. An apparatus or a method may be configured by realizing operations or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

Moreover, the CPU 2012 may cause all or a necessary portion of a file or a database stored in a recording medium such as the flash memory 2024 to be read into the RAM 2014, and execute various types of processing on the data on the RAM 2014. The CPU 2012 then writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval and replacement, or the like described herein and specified by instruction sequences of the programs, and write back a result into the RAM 2014. Moreover, the CPU 2012 may search for information in a file, a database, or the like in the recording medium. For example, when the recording medium stores a plurality of entries, each having an attribute value of a first attribute associated with an attribute value of a second attribute, the CPU 2012 may search for an entry having a specified attribute value of the first attribute that matches a condition among the plurality of entries, and read the attribute value of the second attribute stored in the entry, thereby obtaining the attribute value of the second attribute associated with the first attribute that satisfies a predetermined condition.

A program or a software module described above may be stored in a computer-readable medium on the computer 2000 or in a vicinity of the computer 2000. A recording medium such as a hard disk or a RAM provided in a server system connected to a dedicated communication network or the Internet can be used as a computer-readable medium. The program stored in the computer-readable medium may be provided to the computer 2000 via the network.

The program installed on the computer 2000 and causes the computer 2000 to function as the control unit 200 may work on the CPU 2012 or the like to cause the computer 2000 to function as each unit of the control unit 200, respectively. Information processing written in these programs is read by the computer 2000, thereby functioning as each unit of the control unit 200 which is specific means in which software and a variety of hardware resources mentioned above cooperate with each other. By realizing operations or processing of information according to the intended use of the computer 2000 according to this embodiment using these specific means, the control unit 200 specific to the intended use is constructed.

Various embodiments have been described with reference to the block diagrams and the like. In the block diagrams, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable medium, and/or a processor supplied along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field-programmable gate array (FPGA), a programmable logic array (PLA), or the like.

The computer-readable medium may include any tangible device capable of storing an instruction executed by an appropriate device, and as a result, the computer-readable medium having the instruction stored thereon constitutes at least a part of a product including an instruction that may be executed in order to provide means to execute an operation specified by a processing procedure or a block diagram. Examples of computer-readable media may include an electronic storage medium, a magnetic storage medium, an optical storage medium, an electromagnetic storage medium, a semiconductor storage medium, or the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

The computer-readable instruction may include: an assembler instruction, an instruction-set-architecture (ISA) instruction; a machine instruction; a machine dependent instruction; a microcode; a firmware instruction; state-setting data; or either a source code or an object code written in any combination of one or more programming languages, including an object oriented programming language such as Smalltalk (registered trademark), JAVA (registered trademark), C++, or the like; and a conventional procedural programming language such as a "C" programming language or a similar programming language.

Computer-readable instructions may be provided to a processor of a general purpose computer, a special purpose computer, or other programmable data processing unit, or to programmable circuit, locally or via a local area network (LAN), wide area network (WAN) such as the Internet, and a computer-readable instruction may be executed to provide means to execute operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

- 10: warning system
- 20: vehicle
- 21: radar
- 22: camera
- 24: control apparatus
- 25: GNSS receiving unit
- 26: vehicle speed sensor
- 29: sensor
- 30: driver-assistance control apparatus
- 48: communication apparatus
- 50: base station
- 52: server
- 70: roadway
- 72: walkway
- 80: pedestrian
- 82: terminal
- 200: control unit
- 220: obtainment unit
- 222: risk level determination unit
- 224: attribute information obtainment unit
- 230: selection unit
- 240: classification unit
- 242: communication environment information obtainment unit
- 250: transmission control unit
- 280: storage unit
- 310, 320, 330, 340: area
- 2000: computer
- 2010: host controller
- 2012: CPU
- 2014: RAM
- 2020: input/output controller
- 2022: communication interface
- 2024: flash memory
- 2026: ROM
- 2040: input/output chip

What is claimed is:

1. A warning control apparatus comprising:
    one or more processors and one or more non-transitory computer-readable storage media storing program instructions such that when the program instructions are executed by the one or more processors,
    one or more processors are configured to
    obtain recognition information including position information and a moving direction of each of a plurality of targets present outside a moving object;
    classify the plurality of targets into one or more groups based on the obtained position information and the obtained moving direction of each of the plurality of targets;
    determine, based on position information and a moving direction of the group, a risk level at which each of the one or more groups approaches the moving object;
    select, based on the risk level, one or more selected groups that are to be warned from the one or more groups;
    control transmission of warning information including the position information of the one or more selected groups; and
    obtain information indicating a communication environment,
    wherein
    the one or more processors are further configured to determine, based on the communication environment, a number of the one or more groups into which the plurality of targets are classified,
    the one or more processors are further configured to obtain information indicating a congestion level of the communication environment,
    the one or more processors are further configured to reduce the number of the one or more groups into which the plurality of targets are classified as the congestion level of the communication environment is higher, and
    the one or more processors are further configured to transmit the warning information to one or more terminals corresponding to one or more of the plurality of targets that are to be warned, such that the one or more terminals output alarms to the corresponding one or more of the plurality of targets that are to be warned.

2. The warning control apparatus according to claim 1, wherein
    the recognition information includes the position information, the moving direction, and a moving speed of each of the plurality of targets present outside the moving object, and
    the one or more processors are further configured to classify the plurality of targets into the one or more groups based on the position information, the moving direction, and the moving speed of each of the plurality of targets.

3. The warning control apparatus according to claim 2, wherein
    the one or more processors are further configured to control the transmission of the warning information including central coordinates of position information of the one or more of the plurality of targets that are to be warned as classified into each of the one or more selected groups.

4. The warning control apparatus according to claim 2, wherein
    the one or more processors are further configured to control the transmission of the warning information including a plurality of pieces of coordinate information indicating an area including position information of the one or more of the plurality of targets that are to be warned as classified into each of the one or more selected groups.

5. The warning control apparatus according to claim 1, wherein
    the one or more processors are further configured to control the transmission of the warning information including central coordinates of position information of the one or more of the plurality of targets that are to be warned as classified into each of the one or more selected groups.

6. The warning control apparatus according to claim 1, wherein
the one or more processors are further configured to control the transmission of the warning information including a plurality of pieces of coordinate information indicating an area including position information of the one or more of the plurality of targets that are to be warned as classified into each of the one or more selected groups.

7. The warning control apparatus according to claim 1, wherein
the one or more processors are further configured to obtain the recognition information by performing image recognition of an image captured by a camera mounted on the moving object.

8. The warning control apparatus according to claim 1, wherein
the one or more processors are further configured to control the transmission of the warning information performed without specifying a destination.

9. The warning control apparatus according to claim 1, wherein
the moving object is a vehicle.

10. A moving object comprising the warning control apparatus according to claim 1.

11. A warning control apparatus comprising:
one or more processors and one or more non-transitory computer-readable storage media storing program instructions such that when the program instructions are executed by the one or more processors,
one or more processors are configured to
obtain recognition information including position information and a moving direction of each of a plurality of targets present outside a moving object;
classify the plurality of targets into one or more groups based on the obtained position information and the obtained moving direction of each of the plurality of targets;
determine, based on position information and a moving direction of the group, a risk level at which each of the one or more groups approaches the moving object;
select, based on the risk level, one or more selected groups that are to be warned from the one or more groups; and
control transmission of warning information including the position information of the one or more selected groups,
wherein
the plurality of targets are persons,
the one or more processors are further configured to obtain information indicating an age of each of the plurality of targets,
the one or more processors are further configured to determine, when at least one of targets classified into each of the one or more groups has an age included in a predetermined age group, the risk level to be higher than when none of targets classified into each of the one or more groups has an age included in the predetermined age group, and
the one or more processors are further configured to transmit the warning information to one or more terminals corresponding to one or more of the plurality of targets that are to be warned, such that the one or more terminals output alarms to the corresponding one or more of the plurality of targets that are to be warned.

12. A warning control apparatus comprising:
one or more processors and one or more non-transitory computer-readable storage media storing program instructions such that when the program instructions are executed by the one or more processors,
one or more processors are configured to
obtain recognition information including position information and a moving direction of each of a plurality of targets present outside a moving object;
classify the plurality of targets into one or more groups based on the obtained position information and the obtained moving direction of each of the plurality of targets;
determine, based on position information and a moving direction of the group, a risk level at which each of the one or more groups approaches the moving object;
select, based on the risk level, one or more selected groups that are to be warned from the one or more groups; and
control transmission of warning information including the position information of the one or more selected groups,
wherein
the one or more processors are further configured to transmit the warning information to a server managing position information of a plurality of mobile terminals and to control the transmission of the warning information performed through the server, and
the one or more processors are further configured to transmit the warning information to one or more terminals corresponding to one or more of the plurality of targets that are to be warned, such that the one or more terminals output alarms to the corresponding one or more of the plurality of targets that are to be warned.

13. A warning control method comprising:
obtaining recognition information including position information and a current moving direction of each of a plurality of targets present outside a moving object;
classifying the plurality of targets into one or more groups based on the obtained position information and the obtained moving direction of each of the plurality of targets;
determining, based on position information and a moving direction of the group, a risk level at which each of the one or more groups approaches the moving object;
selecting, based on the determined risk level, one or more selected groups that are to be warned from the one or more groups;
controlling transmission of warning information, including the position information of the one or more selected groups, so as to transmit the warning information to one or more terminals corresponding to one or more of the plurality of targets that are to be warned, such that the one or more terminals output alarms to the corresponding one or more of the plurality of targets that are to be warned;
obtaining information indicating a congestion level of a communication environment;
determining, based on the communication environment, a number of the one or more groups into which the plurality of targets are classified; and
reducing the number of the one or more groups into which the plurality of targets are classified as the congestion level of the communication environment is higher.

14. A non-transitory computer-readable storage medium having stored thereon a program that causes a computer to execute operations comprising:
obtaining recognition information including position information and a moving direction of each of a plurality of targets present outside a moving object;

classifying the plurality of targets into one or more groups based on the obtained position information and the obtained moving direction of each of the plurality of targets;
determining, based on position information and a moving direction of the group, a risk level at which each of the one or more groups approaches the moving object;
selecting, based on the determined risk level, one or more selected groups that are to be warned from the one or more groups;
controlling transmission of warning information including the position information of the one or more selected groups, so as to transmit the warning information to one or more terminals corresponding to one or more of the plurality of targets that are to be warned, such that the one or more terminals output alarms to the corresponding one or more of the plurality of targets that are to be warned;
obtaining information indicating a congestion level of a communication environment;
determining, based on the communication environment, a number of the one or more groups into which the plurality of targets are classified; and
reducing the number of the one or more groups into which the plurality of targets are classified as the congestion level of the communication environment is higher.

* * * * *